United States Patent Office 3,175,942
Patented Mar. 30, 1965

3,175,942
GASTRO-INTESTINAL THERAPEUTIC
William Anderson, Coatbridge, Scotland, and Gordon Francis Hargreaves, Harpenden, England, assignors to Evans Medical Limited, Speke, Liverpool, England, a British company
No Drawing. Filed Mar. 13, 1962, Ser. No. 179,480
6 Claims. (Cl. 167—55)

This invention relates to pharmaceutical preparations and has as an object to provide improved pharmaceutical preparations for the treatment of gastro-intestinal disorders.

The precise aetiology of peptic ulceration of the gastro-intestinal tract is still obscure but the evidence that both gastric acid and pepsin are necessary for the formation and maintenance of ulceration is formidable and is widely accepted, the acid providing a low pH at which the proteolytic activity of pepsin is most effective.

Modern medical treatment of peptic ulcer consists in the main of bedrest and a bland diet, with antacid therapy, sedation and therapy designed to inhibit vagal activity. Progress in treatment during recent years has consisted chiefly in improvements on these lines, and more accurate assessment of the in vitro tests relating to the efficacy of this therapy.

Pepsin is less amenable than gastric acid to the measurement of its quantity, its activity, and its inhibition in the stomach so that while there has been general agreement that it plays an important part in ulcer formation and maintenance, specific treatment designed to inhibit pepsin has been singularly lacking.

It has for many years been believed (Fogelson, J. Am. Med. Assn. (1931), 96, 673; Babkin and Komarov, Canad. Med. Assn. J. (1932), 27, 463) that gastric mucus had antipepsin properties, and most interest has been shown in the fraction of gastric mucus containing sulphated polysaccharide having antipepsin activity. This property is not limited to those sulphated polysaccharides which occur most abundantly in the secretions of the human and animal stomach but is also present in substances of similar structure such as heparin (Levy and Sheinfield, Gastroenterology (1954), 27, 625); Rosen et al., Proc. Soc. Exp. Biol., N.Y. (1956), 92, 439). Polysaccharides lacking a sulphate group (such as hyaluronic acid) have on the other hand been shown to be devoid of pepsin-inhibiting properties (Levy and Sheinfield, loc. cit.).

Following extensive laboratory experiments, we have been able to confirm that certain sulphated polysaccharides have a definite pepsin-inhibitory activity.

Furthermore, Rosen et al. (loc. cit.) have shown the value of a sulphated polysaccharide in greatly lowering the incidence of induced gastric ulcers in the Shay rat.

In respect of the naturally occurring sulphated polysaccharides of marine algal origin or other polysaccharides which, following sulphation, show antipepsin activity, we have found, for example, that fucoidin and carrageenin and solid material prepared from aqueous or dilute acid extracts of *Fucus vesiculosus*, *Ascophyllum nodosum*, or of *Chondrus crispus*, for example, inhibit gastric pepsin activity. We have also found that these substances share this property with other naturally occurring sulphated polysaccharides, for example, heparin and chondroitin sulphate. They are almost as active (in respect of antipepsin activity) as heparin and considerably more active than chondroitin sulphate. Fucoidin and carrageenin have other properties which make them more desirable than heparin or chondroitin sulphate for example; compared with heparin, fucoidin is less toxic, is generally more stable, is cheaper and is more readily available. Compared with synthetic sulphates of polysaccharides, for example, laminarin sulphate and dextran sulphate, fucoidin and carrageenin are less toxic, more stable, much cheaper, and are more readily obtained.

According to the present invention pharmaceutical preparations in dosage form are provided comprising a composition in dosage form comprising a degraded sulphated polysaccharide showing antipepsin activity selected from the group consisting of marine algae, naturally occurring sulphated polysaccharides of marine algal origin and polysaccharides of marine algal origin which have been sulphated, and are antacid.

The preferred sulphated polysaccharides are fucoidin and carrageenin, which have several advantageous properties; for example they occur naturally in sulphated form; they are the most active (in respect of antipepsin activity) of non-toxic substances of similar nature; they are completely harmless to human beings; the raw materials from which they are obtained are exceedingly abundant; they are very cheap; they are stable; they are soluble in water and gastric juice; they have a bland, not unpleasant taste; they do not interfere with the subsequent digestion of protein by trypsin, and their antipepsin activity is not destroyed by saliva.

Although as normally extracted, fucoidin is obtained as a fawn coloured powder whose solutions are not appreciably more viscous than water, carrageenin as normally extracted from *Chondrus crispus* gives solutions which when they contain about 5% of carrageenin set to stiff gels. This property is disadvantageous in the preparation of pharmaceutical preparations in the form of liquids and tablets containing carrageenin.

It is well known that the viscosity of these solutions can be reduced or destroyed by heating with dilute mineral acid. But during this process as usually carried out, desulphation also occurs, resulting in a product with diminished antipeptic properties or none at all.

We have devised a process for the production of a novel form of degraded carrageenin from which solutions of carrageenin of reduced viscosity can be obtained without desulphation and without loss of antipeptic activity.

The process is one of controlled treatment with acid, for example mineral acid, in the presence of an organic liquid in which the carrageenin is insoluble, for example acetone or alcohol.

Carrageenin, as normally obtained from Irish moss, is mixed with acetone and to this is added water and mineral acid, for example hydrochloric acid or other mineral acid, and the mixture is allowed to stand with occasional stirring until a solution of a sample of the carrageenin is of the required viscosity. When this has occurred the mixture is adjusted to pH 7-8 with alkali, for example sodium hydroxide. The carrageenin is then filtered, washed with acetone, dissolved in water, decolorised, and precipitated from solution with acetone or alcohol. The preparation so obtained is re-dissolved in water and re-precipitated with acetone or alcohol and dried. The re-solution and re-precipitation process is repeated until a product of satisfactory purity is obtained, using techniques known to those skilled in the art.

The essential part of the process in the controlled treatment with acid in the presence of an organic liquid, for example acetone or alcohol.

The following is an example of this treatment of carrageenin:

25 kilograms of commercial carregeenin (5% w./v. solution forms a stiff gel) was mixed with 75 litres of acetone and to this was added a mixture of 3 litres of water and 75 litres of concentrated hydrochloric acid solution and the mixture allowed to stand at room temperature, with occasional stirring, for 24 hours or until solutions of the carrageenin considerably stronger than 5% (for example 25% and greater) did not gel.

The carrageenin was filtered off, washed with the organic liquid, dissolved in water, the solution adjusted to pH 7 to 8 with alkali, filtered and decolorised by using charcoal or by repeated acetone precipitation, finally precipitated very carefully by pouring slowly into acetone and carefully dried to give a white powder readily soluble in water and having the same combined sulphate content (viz., ca. 30%) and antipeptic activity as the starting material (commercial carrageenin).

The treatment described above produces the process for preparing water-soluble, non-gelling degraded carrageenin having the combined sulphate content and antipeptic activity of undegraded carrageenin which comprises mixing commercial carrageenin with an organic non-solvent therefor, adding water and acid to such mixture, allowing the mixture to stand with occasional stirring until a test sample has the desired viscosity, adjusting the pH of the mixture approximately to neutrality with alkali, forming a water solution of the resulting degraded carrageenin and recovering it by precipitation from the aqueous solution by adding an organic non-solvent therefor.

The novel degraded carrageenin produced as described above having a sulphate content from about 28% to about 32%, is soluble in water to the extent of about 45 grams to about 50 grams per 100 ml. of water at room temperature, forms a 21% w./v. aqueous solution which at 22° C. exhibits a viscosity of about 20 to 40 centipoises, has a molecular weight of less than 20,000 and an optical rotation of +33°.

This novel degraded carrageening is further characterised by having a sodium content of from about 6 to about 10%, a potassium content of from about 0.94 to about 1.3% and a calcium content of from about 0.1 to about 0.21%.

A preferred form of the invention therefore provides a pharmaceutical composition in dosage form comprising degraded carrageenin as defined above and an antacid substance.

The preparations of the present invention may also contain one or more of the following groups of therapeutic substances: (a) antispasmodics, (b) demulcents, (c) pharmacologically active agents which facilitate the repair of tissues, and (d) mood-modifying drugs or sedatives.

The preparations of the present invention may be used in any desired form, for example tablets, powders, granules or as liquid preparations, for example suspensions or solutions.

The preparations of the present invention are useful in the treatment of gastro-intestinal disorders such as gastric ulcer, duodenal ulcer, gastritis, hyperchlorhydria and other digestive disturbances.

Examples of antacids which may be employed are aluminium hydroxide, aluminium glycinate and calcium csarbonate. It will be understood that a mixture of antacids may be used.

The antacid substances employed should not normally raise the pH of gastric contents above about 5, since sulphated polysaccharides will only inhibit peptic activity in acid media.

An example of antispasmodic substance which may be used is atropine sulphate.

Atropine sulphate does not affect the antipepsin activity of fucoidin or carrageenin. The main purpose of the presence of atropine in the preparation is to decrease the motility of the stomach and to depress the secretion of gastric juice, both of which factors are important in ulcer treatment. Not only does the fucoidin or carrageenin inhibit the gastric pepsin but it also combined with gastric tissue protein thereby preventing the access of any residual pepsin to the ulcer crater.

The presence of an antacid together with fucoidin or carrageenin is beneficial because it raises the pH of the stomach contents to a desirable level by buffering gastric acid. It has recently been confirmed by Perry et al. (Proc. Soc. Exp. Biol., N.Y. (1956), 92, 237), that in certain conditions the level of gastric acid and pepsin are to some degree correlated. The most beneficial form of therapy should therefore include both an effective antipepsin agent and an antacid substance or substances such a aluminium hydroxide, aluminium glycinate or sodium bicarbonate.

The following examples illustrate the pharmaceutical composition of the invention.

*Example I*

30 grams of fucoidin were mixed with 30 grams of sodium bicarbonate and the mixture granulated by mixing with it 11 millilitres of the solution of 75% ethyl alcohol in water, passing this mixture through a stainless steel sieve and drying the granules so formed at 50° C. 600 milligrams of stearic acid were added to the granules which were compressed into tablets containing 300 milligrams of fucoidin and 300 milligrams of sodium bicarbonate.

*Demonstration of activity (antipepsin).*—One of these tablets was dissolved in 60 millilitres of acid solution, the reaction of the solution being pH 1.6. 1 millilitre of this solution, therefore, contained 5 milligrams of fucoidin and the equivalent of 5 milligrams of sodium bicarbonate. The test was set up as follows:

| Tube No. | Reaction Mixture |
|---|---|
| 1 | P+F+Hb |
| 2 | P+F+Hb |
| 3 | P+FT+Hb |
| 4 | P+FT+Hb |
| 5 | P+b+Hb |
| 6 | P+b+Hb | together with appropriate blanks to allow assessment of the contribution to the measured colour of pepsin, fucoidin and haemoglobin separately.

Explanation of symbols:

P = 1 millilitre of pepsin (granular 1:10,000) solution pH 1.6 containing 20 milligrams of this pepsin in 100 millilitres.

b = 1 millilitre of hydrochloric acid solution pH 1.6.

F = 1 millilitre of fucoidin solution (5 milligrams/millilitre) pH 1.6.

FT = 1 millilitre of solution of tablet. 1 millilitre contains 5 milligrams of fucoidin and 5 milligrams of sodium bicarbonate.

Hb = 1 millilitre of haemoglobin solution (equine) pH 1.6 containing 1200 milligrams of haemoglobin in 100 millilitres.

*Method.*—The pepsin and fucoidin (or fucoidin tablet with sodium bicarbonate or acid solution pH 1.6) were pre-incubated in a water bath at 37° C. for 10 minutes and the substrate was then added. Incubation was then allowed to proceed for 30 minutes, after which the tubes were removed from the water bath and 10 millilitres of 10% trichloracetic acid was added to each and the contents shaken. The tubes were allowed to stand for 15 minutes then the contents were filtered (Whatman No. 3). 5 millilitres of the filtrate were taken and to this were added 10 millilitres of N-NaOH and 3 millilitres of Folin-Ciocalteau's phenol reagent (diluted 1+2 with water). The blue colour which developed was measured in an absorptiometer using a red filter. The blue colour developed was proportional to peptic activity over the useful range of optical densities.

RESULTS

| Tube No. | Optical Density × 1,000 corrected for blanks | Percent Reduction in Optical Density | Mean |
| --- | --- | --- | --- |
| 1 | 335 | 49 | }48 |
| 2 | 352 | 47 | |
| 3 | 332 | 50 | }49 |
| 4 | 343 | 48 | |
| 5 | 661 | | |
| 6 | 666 | | |

The percentage reduction in optical density indicates percentage reduction in peptic activity.

In acid conditions in the human stomach, sodium bicarbonate in appropriate dosage does not affect the antipepsin activity of fucoidin. The purpose of the sodium bicarbonate is to react with excess acid which occurs in gastric conditions which the preparation will be used to treat.

Example II

Preparation of carrageenin and aluminium hydroxide in liquid form.

What is usually referred to in pharmacy and medicine as aluminium hydroxide is prepared by reacting a soluble aluminium salt with an alkali and collecting the precipitate. The precipitate is then diluted to give a thixotropic suspension of aluminium hydroxide of known alumina content (usually between 3.5 and 4.4% w./w. $Al_2O_3$).

In this example enough carrageenin of the non-gelling type, whose preparation is described above, was added to the precipitates of aluminium hydroxide to give the required percentage, 10% or 14%, in the final preparation, together with enough sorbitol to give 1% w./v. in the final preparation, and water added almost to volume. The carrageenin and sorbitol dissolved in the water. Flavouring agents and preservative were added in the usual manner and the final volume of the preparation adjusted.

The purpose of the sorbitol is to prevent the carrageenin causing the suspension of aluminium hydroxide to gel. Without sorbitol a suspension of aluminium hydroxide containing carrageenin, even of the type whose preparation is described above, will eventually solidify. In the presence of sorbitol, for example 1% w./v., this solidification will not occur even at reasonably elevated temperatures, for example 45° C. Other substances which can fulfill the same function as sorbitol are organic hydroxy compounds, for example, mannitol, glycerol, citrates and tartrates.

Using carrageenin of the type whose preparation is described herein, concentrations of 15% w./v. and greater in the aluminium hydroxide suspension can be prepared, the resulting preparation having fluidity convenient for use; whereas incorporating carrageenin as normally obtained in commerce, suspensions of aluminium hydroxide of the strength generally used in medicine cannot be prepared to remain in a fluid state and to contain more than about 2% of the carrageenin as normally obtained. This is a great advantage since the frequency of dosage is reduced considerably.

*Antipeptic activity.*—The preparation was centrifuged and enough of the supernatant liquid removed. This was diluted with acid solution to contain 5 milligrams of carrageenin per millilitre.

The test was performed as in Example I, substituting carrageenin for fucoidin and substituting $T_3$ (1 mil of the diluted supernatant liquid containing 5 milligrams of carrageenin) for FT.

Approximate blanks and controls were employed.

*Results.*—The percentage inhibition of peptic activity averaged 50% and 52% for $T_3$ as compared with 49% and 49% for an equivalent amount of the carrageenin itself.

Example III

Tablet preparation of carrageenin with dried aluminum hydroxide.

200 grams of finely powdered carrageenin of the non-gelling type were mixed with 120 grams of dried finely powdered aluminum hydroxide and 100 grams of dried starch. Sufficient of a mixture containing 75% of acetone and 25% of water were added and mixed with powders. The mixtures was passed through a sieve of suitable mesh size and dried at 30–40° C. Flavouring and sweetening agents, for example oils of peppermint and spearmint, and saccharin, were added in a manner known to those skilled in the art; preservative, for example benzoic acid, and 16 grams of talc were added and mixed thoroughly with the granules which were then compressed into tablets containing 500 milligrams of carrageenin and 300 milligrams of dried aluminum hydroxide, together with the other constituents of the tablets.

*Antipeptic activity.*—The tablets were crushed and shaken with water to dissolve the carrageenin. This solution was separated from the water-insoluble material by centrifuging and filtration, and adjusted to contain 5 milligrams of carrageenin per millilitre at pH 1.6. The test was then conducted as described in Example 1, substituting CT for FT where CT=1 millilitre of solution containing 5 milligrams of carrageenin.

The percentage inhibition of peptic activity was 52% and 49% for CT, compared with 63% and 62% for an equivalent amount of carrageenin alone.

Similar results were obtained when the test was conducted at pH 3.5, the approximate pH to which aluminium hydroxide raises gastric contents.

Example IV

Example of a naturally occurring polysaccharide sulphated in the laboratory after isolation.

200 grams of finely powdered laminarin sulphate were substituted for 200 grams of carrageenin in Example III and the tablets prepared as described in Example III.

Antipeptic activity was determined as described in Example III substituting laminarin sulphate for carrageenin.

The following further examples illustrate the preparation of the degraded carrageenin and also compositions containing it.

In these examples the anti-peptic activity of the degraded carrageenin was expressed in relation to a standard set by placing 5 mg. of purified degraded carrageenin in 3 ml. of acid water having a pH of 1.6 and containing a mixture of 0.2 mg. of pepsin (1:10,000) and haemoglobin equivalent to 2 mg. of nitrogen. This mixture is digested for 1 hour. A blank or control reaction mixture is prepared which is similar to the mixture described above in all respects with the exception that degraded carrageenin is omitted. There is 50% less peptic digestion of the haemoglobin with the solution containing the degraded carrageenin than with the blank solution. The anti-peptic activity contained in this quantity of degraded carrageenin in this standard preparation is designated as 10 units. The reagents and method of test are carefully standardized and are completely reproducible.

This standard will hereinafter be referred to as standard degraded carrageenin. The anti-peptic activity of the degraded carrageenin of this invention is from about 85% to about 90% of standard degraded carrageenin.

Example V 25 kilograms of commercial carrageenin (5% w./v. solution forms a stiff gel) is mixed with 75 litres of acetone and to this is added a mixture of 3 litres of water and 75 litres of concentrated hydrochloric acid solution and the mixtures allowed to stand at room temperature, with occasional stirring, for 24 hours or until solutions of the carrageenin considerably stronger than 5% (for example 25% and greater) do not gel.

The carrageenin is filtered off, washed with the organic liquid, dissolved in water, the solution adjusted to pH 7 to 8 with alkali, filtered and decolourised by using charcoal or by repeated acetone precipitation, finally precipitated very carefully by pouring slowly into acetone and carefully dried to give a white powder readily soluble in water and having the same combined sulphate content (vis., ca. 30%) and antipeptic activity as the starting material (commercial carrageenin).

Example VI 25 kilograms of commercial carrageenin (5% w./v. solution forms a stiff gel) is mixed with 75 litres of acetone and to this is added a mixture of 3 liters of water and 75 litres of concentrated hydrochloric acid solution and the mixture is allowed to stand at room temperature, with occasional stirring until solutions of carrageenin in excess of 25% w./v. do not gel. The carrageenin is filtered off, washed with the organic liquid and dissolved in water. The solution is adjusted to pH from about 7 to 8 with alkali, filtered and decolourised by using charcoal. Final precipitation is accomplished by carefully pouring into acetone. The white precipitate is then filtered, thoroughly washed with fresh acetone, and dried at 50° C.

The resultant degraded carrageenin has a sulphate content of 30.5%. The viscosity of a 21% aqueous solution at 22° C. is 30 centipoises. A 50% w./v. solution does not give a stiff gel. It has a sodium content of 8%, a potassium content of 1.2% and a calcium content of 0.17%. The anti-peptic activity is 87% of standard.

Example VII

A mixture of 120 mls. of water and 300 mls. of concentrated hydrochloric acid is added to 3 litres of acetone and to this mixture is added 1000 gms. of commercial carrageenin. The thick suspension is mixed well and allowed to stand 48 hours at room temperature. The solid is filtered from the dark coloured acid liquor, washed with fresh acetone and stirred into 3½ litres of cold water. The solution is neutralised with caustic soda solution and the neutralised solution is stirred wth decolourising charcoal and filtered. The degraded carrageenin is isolated by running the solution with stirring into 3 volumes of acetone. The white precipitate is filtered, washed with fresh acetone and dried at 50° C.

The resultant degraded carrageenin has a sulphate content of 31.0%. The viscosity of a 21% aqueous solution at 22° C. is 33 centipoises. The solubility at room temperature is 48 grams per 100 ml. of water. Further analysis shows a sodium content of from about 6 to about 10%, a potassium content of from about 0.94 to about 1.3% and a calcium content of 0.1 to about 0.21%. The anti-peptic activity is 85–90% of standard.

Example VIII

Ingredients: Amounts per tablet, mg.
Degraded carrageenin _____ 50.00
Lactose, powdered _____ 125.00
Sucrose, powdered _____ 125.00
Talc _____ 15.00
Magnesium stearate _____ 2.50

The degraded carrageenin, lactose and sucrose are mixed and screened through a 60 mesh U.S. standard screen. The screened mixture is then granulated with an alcoholic ethyl cellulose solution and the wetted mass is screened through an 8 mesh U.S. standard screen. The granules are dried and passed through a 12 mesh screen. These granules are then mixed with the talc, magnesium stearate, peppermint and spearmint and compressed into tablets.

Two tablets are administered once a day.

Example IX

Ingredients: Amounts per tablet, mg.
Degraded carrageenin _____ 250.00
Aluminium hydroxide-magnesium carbonate (antacid)—a co-precipitate consisting of 8% aluminium hydroxide and 1.2% magnesium carbonate _____ 175.00
Sucrose, powdered _____ 100.00
Acacia _____ 12.50
Sodium benzoate _____ 0.60
Peppermint _____ 2.80
Spearmint _____ 1.40
Magnesium stearate _____ 2.75

The degraded carrageenin, sucrose, antacid and sodium benzoate are mixed and passed through a 60 mesh U.S. standard screen. The screened mixture is then granulated with an alcoholic ethyl cellulose solution and the wetted mass is screened through an 8 mesh U.S. standard screen. The granules are dried and passed through a 12 mesh screen. These granules are then mixed with the talc, magnesium stearate, peppermint and spearmint and compressed into tablets.

One table is administered four times a day.

Example X

Ingredients: Amounts per tablet, mg.
Degraded carrageenin _____ 500.00
Starch _____ 75.00
Magnesium stearate _____ 2.50

The degraded carrageenin and half the amount of starch are mixed and screened through a 60 mesh U.S. standard screen. The screened mixture is then granulated with an alcoholic ethyl cellulose solution and the wetted mass screened through an 8 mesh U.S. standard screen. The granules are dried and passed through a 12 mesh screen. These granules are then mixed with the remaining starch and magnesium stearate and compressed into tablets.

One tablet is administered twice a day.

Example XI

Ingredients: Amounts
Degraded carrageenin _____grams__ 10.000
Sodium saccharin _____do____ 0.025
D-sorbitol _____do____ 2.000
Methylparaben _____do____ 0.125
Propylparaben _____do____ 0.025
Sodium metabisulphite _____do____ 0.100
Oil of peppermint _____do____ 0.010
Purified water, U.S.P., q.s. 100.000 ml.

The parabens are dissolved in 15 ml. of hot water and to this is added the sorbitol, saccharin and sodium metabisulphite which had previously been dissolved in 20 ml. of water. The degraded carrageenin is dissolved in 30 ml. of water and this is combined with the above solution and thoroughly mixed. The oil of peppermint is then added and the preparation is brought up to volume with purified water.

Two tablespoonsful are administered 4 times a day.

Example XII

Ingredients: Amounts
Degraded carrageenin _____grams__ 10.000
Antacid gel (aluminium hydroxide-magnesium carbonate co-precipitate) 8% aluminium hydroxide and 1.2% magnesium carbonate _____grams__ 60.000
Sodium saccharin _____do____ 0.025
D-sorbitol _____do____ 2.000
Methylparaben _____do____ 0.125
Propylparaben _____do____ 0.025
Sodium metabisulphite _____do____ 0.100
Oil of peppermint _____do____ 0.010
Purified water, U.S.P., q.s. 100.000 ml.

The parabens, sorbitol, saccharin and sodium metabisulphite are dissolved in 25 ml. of water. The antacid gel is then added to this solution and thoroughly mixed. The degraded carrageenin is dissolved in 30 ml. of water and combined with the above solution. This solution is then mixed and the oil of peppermint is added. The preparation is brought up to volume with purified water.

*Example XIII*

| Ingredients: | Amounts |
|---|---|
| Degraded carrageenin _____grams__ | 40.000 |
| Sodium saccharin _____do____ | 0.025 |
| D-sorbitol _____do____ | 2.000 |
| Methylparaben _____do____ | 0.125 |
| Propylparaben _____do____ | 0.025 |
| Sodium metabisulphite _____do____ | 0.100 |
| Antifoam (a combination of fats with foam eliminating oils used to prevent or reduce foam formation and manufactured by American Cyanamid Co.) _____grams__ | 0.050 |
| Oil of peppermint _____ml__ | 0.010 |
| Purified water, U.S.P., q.s. 100.000 ml. | |

The parabens are dissolved in 15 ml. of hot water and to this is added the sorbitol, saccharin and sodium metabisulphite which had previously been dissolved in 20 ml. of water. The antifoam and degraded carrageenin are dissolved in 30 ml. of water and this is combined with the above solution and thoroughly mixed. The oil of peppermint is then added and the preparation is brought up to volume with purified water.

One tablespoonful is administered four times a day.

This application is a continuation in part of our co-pending application No. 22,397, filed on April 15, 1960, which is now abandoned, which is itself a continuation in part of our co-pending application No. 708,982, filed on January 15, 1958, which is now abandoned.

What we claim is:

1. A pharmaceutical composition in dosage form comprising degraded carrageenin having a sulphate content from about 28% to about 32% a molecular weight less than 20,000 and an optical rotation of $+33°$ said degraded carrageenin being soluble in water to the extent of about 45 grams to about 50 grams per 100 ml. of water at room temperature and forming a 21% w./v. aqueous solution which at 22° C. exhibits a viscosity of about 20 to about 40 centipoises, and an antacid.

2. A composition according to claim 1 in which the antacid is aluminium hydroxide.

3. A composition according to claim 2 in which has been incorporated an anti-gelling agent for the aluminium hydroxide.

4. The process for preparing water-soluble, non-gelling degraded carrageenin having a sulphate content from about 28% to about 32% a molecular weight less than 20,000 and an optical rotation of $+33°$ said degraded carrageenin being soluble in water to the extent of about 45 grams to about 50 grams per 100 ml. of water at room temperature and forming a 21% w./v. aqueous solution which at 22° C. exhibits a viscosity of about 20 to about 40 centipoises, which comprises mixing commercial carrageenin with an organic non-solvent therefor, adding water and mineral acid to such mixture, allowing the mixture to stand with occasional stirring until a test sample has the desired viscosity, adjusting the pH of the mixture approximately to neutrality with alkali, forming a water solution of the resulting degraded carrageenin and recovering it by precipitation from the aqueous solution by adding an organic non-solvent therefor.

5. Degraded carrageenin which has a sulphate content from about 28% to about 32%, is soluble in water to the extent of about 45 grams to about 50 grams per 100 ml. of water at room temperature, forms a 21% w./v. aqueous solution which at 22° C. exhibits a viscosity of about 20 to about 40 centipoises, has a molecular weight of less than 20,000 and an optical rotation of $+33°$ C.

6. The method of treating gastro-intestinal ulcers, gastritis and hyperchlorhydria in a human being which comprises orally administering a daily dosage of about 100 mg. to about 25 g. of degraded carrageenin having a sulphate content from about 28% to about 32% a molecular weight less than 20,000 and an optical rotation of $+33°$ said degraded carrageenin being soluble in water to the extent of about 45 grams to about 50 grams per 100 ml. of water at room temperature and forming a 21% w./v. aqueous solution which at 22° C. exhibits a viscosity of about 20 to about 40 centipoises.

References Cited by the Examiner

UNITED STATES PATENTS 2,833,960  5/58  Entrekin _____ 167—55

OTHER REFERENCES

Masson et al.: Can. J. Chem., vol. 32, pp. 51–58.
Remington's Practice of Pharmacy, Mack Publ. Co., 1956, pp. 1024–1032.
Rose: Chem. Abs., vol. 44, p. 8553g, 1950.
Dillon: Chem. Abst., vol. 46, p. 439(e), 1952.
Smith: Arch. Biochem.-Biophy., vol. 45, p. 232, 1953.
Rose: Canad. J. of Research, 1950, vol. 28, pp. 202–212.
Stoloff: Ford Technol., vol. 4, pp. 138–141, 1950.
Levy et al.: Gastroenterology, vol. 27, pp. 625–628, 1954.

LEWIS GOTTS, *Primary Examiner.*

M. O. WOLK, IRVING MARCUS, *Examiners.*